United States Patent
Mitani et al.

(10) Patent No.: US 7,094,306 B2
(45) Date of Patent: Aug. 22, 2006

(54) PHOTOCURABLE ORGANIC POLYMER COMPOSITION

(75) Inventors: Osamu Mitani, Chiba Prefecture (JP); Masayuki Onishi, Chiba Prefecture (JP); Akiko Takanami, Chiba Prefecture (JP)

(73) Assignee: Dow Corning Toray Silicone Co., Ltd., (JP)

( * ) Notice: Subject to any disclaimer, the term of this patent is extended or adjusted under 35 U.S.C. 154(b) by 43 days.

(21) Appl. No.: 10/498,396

(22) PCT Filed: Dec. 17, 2002

(86) PCT No.: PCT/JP02/13200

§ 371 (c)(1),
(2), (4) Date: Jun. 10, 2004

(87) PCT Pub. No.: WO03/051933

PCT Pub. Date: Jun. 26, 2003

(65) Prior Publication Data

US 2005/0090574 A1    Apr. 28, 2005

(30) Foreign Application Priority Data

Dec. 18, 2002  (JP) .............................. 2001-384097

(51) Int. Cl.
*B29C 65/00* (2006.01)

(52) U.S. Cl. ................... 156/275.5; 427/515; 427/508; 522/120; 522/129; 522/172; 522/184

(58) Field of Classification Search ................ 522/172, 522/99, 120, 129, 184; 156/275.5; 427/515, 427/508
See application file for complete search history.

(56) References Cited

U.S. PATENT DOCUMENTS

| 4,528,081 A | 7/1985 | Lien et al. |
| 5,371,116 A | 12/1994 | Sakamoto et al. |
| 5,665,823 A | 9/1997 | Saxena et al. |
| 5,700,874 A | 12/1997 | Takeichi et al. |
| 5,936,110 A | 8/1999 | Yoshitake et al. |
| 5,945,555 A | 8/1999 | Yoshitake |

FOREIGN PATENT DOCUMENTS

| EP | 0 336 474 | 10/1989 |
| JP | H 10-182669 | 7/1998 |
| JP | H 10-195085 | 7/1998 |

*Primary Examiner*—Susan Berman
(74) *Attorney, Agent, or Firm*—Robert L. McKellar; McKellar IP Law, PLLC

(57) ABSTRACT

A photocurable organic polymer composition can be quickly cured into a moisture-penetration-resistant solid body by irradiation with ultraviolet rays, electron beams, or the like, and imparts adhesiveness to a cured body after aging. The photocurable organic polymer composition includes: (D) a photoinitiator and either (I) a composition or (II) a reaction product; where (I) the composition includes (A) a liquid organic polymer having at least one hydroxy group per molecule;
(B) a radiation curable alkoxysilane; and
(C) a condensation-reaction catalyst; and (II) the reaction product comprises (F) a reaction product of components (A), (B), and (C).

24 Claims, No Drawings

PHOTOCURABLE ORGANIC POLYMER COMPOSITION

The present invention relates to a photocurable organic polymer composition, and more particularly, to a photocurable organic polymer composition that can be quickly cured under the effect of irradiation with light energy, such as infrared rays, electronic beam, or the like, to form a moisture-resistant cured body, which after aging develops adhesiveness.

BACKGROUND

As photocurable organic polymer compositions can be quickly cured under the effect of light radiation such as infrared rays or electron beams, they find wide application as coating agents for parts of electronic devices. For example, Japanese Laid-Open Patent Application Publication (hereinafter referred to as "Kokai") S61-127718 (U.S. Pat. No. 4,528,081) describes a curable moisture-penetration-resistant polyorganosiloxane composition which consists of a silicone oil having a trimethylsilyl terminal group, a photosensitizer, and a reactive polyorganosiloxane which contains a condensation-reaction catalyst. The aforementioned reactive polyorganosiloxane is obtained as a result of a reaction between a silanol-capped polyorganosiloxane and an acryl-trialkoxysilane or an acryl-triallyloxysilane in the presence of said catalyst. The aforementioned reaction results in the formation of acryldialkoxysilyl or acryldiallyloxysilyl terminal groups. Furthermore, Kokai H6-32985 (U.S. Pat. No. 5,371,116) describes a curable polyorganosiloxane composition which is characterized by photocurable and moisture-resistant properties and consists of a silanol-capped polyorganosiloxane, methacryl-functional alkoxysilane, a tin-type compound, alkoxy-α-silyl ester, a photoinitiator, and a curing catalyst.

However, in a cured state the aforementioned optically-curable polyorganosiloxane composition is not able to provide sufficient resistance to moisture, and therefore when electronic parts having coatings made of such compositions are used in a humid environment, their electroconductive elements are subject to corrosion.

It is also known to make coatings of electronic parts from photocurable organic polymer compositions that contain adhesion promoters of an alkoxysilane type, but such agents have low adhesiveness and cannot provide sufficient protection of electronic parts from corrosion.

INVENTION

The photocurable organic polymer composition of the present invention comprises at least the following components:

(A) a liquid organic polymer having at least one hydroxy group per molecule;

(B) a radiation curable alkoxysilane;

(C) a condensation-reaction catalyst; and (D) a photoinitiator.

Alternatively, the photocurable organic polymer composition of the invention comprises at least the following components:

(F) a liquid organic polymer, wherein at least one hydroxy group per molecule is replaced by a radiation curable alkoxysiloxy group; and (D) a photoinitiator.

DETAILED DESCRIPTION OF THE INVENTION

The liquid organic polymer (A), which has at least one hydroxy group per molecule, is the main component of the composition of the invention. Although there are no special restrictions with regard to the viscosity of component (A) at 25° C., it is recommended that the viscosity be within the range of 10 to 1,000,000 milliPascal·seconds (mPa·s), preferably from 50 to 100,000 mPa·s. Also, there are no special restrictions with regard to the type of the aforementioned liquid organic polymer (A), provided that it has at least one hydroxy group per molecule. For example, it can be a polybutadiene, polyisoprene, polyisobutylene, polybutylene glycol, polypropylene glycol, polyethylene glycol-polypropylene glycol copolymers, polyethylene glycol-polybutylene glycol copolymers, or a hydrolyzate of the above.

Although there are no special restrictions with regard to the amount in which component (A) could be used, it is recommended to use this component in an amount from 50 to 95 wt. %, preferably from 70 to 90 wt. %. If component (A) is used in an amount smaller than the lower limit of the recommended range, a cured body formed from the composition will have a reduced mechanical strength. If component (A) is used in an amount exceeding the upper recommended limit, the obtained composition will show a tendency to a decrease in photocuring properties.

Component (B) is used for imparting to the composition of the invention photocuring and moisture-resistant properties. Component (B) is a radiation curable alkoxysilane containing at least one radiation curable group. The alkoxysilane is represented by the following general formula:

$R'_x Si(OR'')_{(4-x)}$

In the above formula, x is 1 or 2. Preferably x has a value of 1. R' is independently selected from the group consisting of a monovalent hydrocarbon group and radiation curable group selected from the group consisting of an acryloxy group, methacryloxy group, and epoxy group with the proviso that at least one R' is the radiation curable group. The monovalent hydrocarbon group of R' is exemplified by methyl, ethyl, propyl, butyl, pentyl, hexyl, heptyl, or a similar alkyl; phenyl, tolyl, xylyl, naphthyl, or a similar aryl; benzyl, phenethyl, or a similar aralkyl; chloromethyl, 3-chloropropyl, 3,3,3-trifluoropropyl, or a similar halogenated alkyl. The acryloxy group of R' is exemplified by gamma-acryloxymethyl, gamma-acryloxyethyl, and gamma-acryloxypropyl. The methacryloxy group of R' is exemplified by gamma-methacryloxymethyl, gamma-methacryloxyethyl, and gamma-methacryloxypropyl, with gamma-acryloxypropyl and gamma-methacryloxypropyl being preferred. The epoxy group of R' is exemplified by 1,2-epoxyethyl, 2,3-epoxypropyl, 3,4-epoxybutyl, 5,6-epoxyhexyl, 9,10-epoxydecyl, glycidoxymethyl, alpha-glycidoxyethyl, beta-glycidoxyethyl, alpha-glycidoxypropyl, beta-glycidoxypropyl, gamma-glycidoxypropyl, 2-(3,4-epoxycyclohexyl)ethyl, 3-(3,4-epoxycyclohexyl)propyl, and 3,4-epoxycyclohexylbutyl. R'' is an alkyl group. The alkyl group of R'' is exemplified by methyl, ethyl, propyl, butyl, pentyl, and hexyl, with methyl or ethyl being preferred. Because of availability, cost and reactivity, methoxy silanes and ethoxy silanes are the most preferred.

The acryloxy group- or methacryloxy group-containing alkoxysilane of Component (B) is represented by the following general formula:

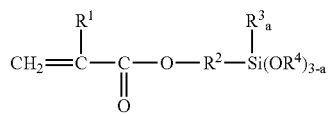

In the above formula, $R^1$ is a hydrogen atom or methyl. A hydrogen atom is preferable. $R^2$ is a divalent hydrocarbon group with 1 to 10 carbon atoms. The following are examples of such divalent hydrocarbon groups: methylene, ethylene, propylene, propylene, butylene, pentylene, hexylene, heptylene, or a similar alkylene; phenylene, tolylene, xylylene, naphthylene, or a similar arylene; and benzylene, phenethylene, or a similar arylenealkylene. The most preferable group for $R^2$ is methylene, ethylene, or propylene. $R^3$ designates a monovalent hydrocarbon group, such as methyl, ethyl, propyl, butyl, pentyl, hexyl, heptyl, or a similar alkyl; phenyl, tolyl, xylyl, naphthyl, or a similar aryl; benzyl, phenethyl, or a similar aralkyl; chloromethyl, 3-chloropropyl, 3,3,3-trifluoropropyl, or a similar halogenated alkyl. The aforementioned monovalent hydrocarbon groups can be substituted or unsubstituted. In the above formula, $R^4$ is an alkyl group, such as a methyl group, ethyl group, propyl group, butyl group, pentyl group, hexyl group, or heptyl group. In the above formula, a is 0 or 1.

The alkoxysilane is exemplified by the following formulae:

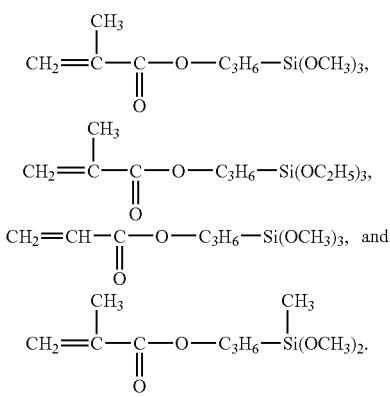

The epoxy group-containing alkoxysilane of component (B) is exemplified by glycidoxymethyltriethoxysilane, alpha-glycidoxyethyltrimethoxysilane, alpha-glycidoxyethyltriethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxypropyldimethylethoxysilane, and 2-(3,4-epoxycyclohexyl)ethyltrimethoxysilane, with gamma-glycidoxypropyltrimethoxysilane, and 2-(3,4-epoxycyclohexyl)ethyltrimethoxysilane being preferred, and 2-(3,4-epoxycyclohexyl)ethyltrimethoxysilane being especially preferred.

Although there are no special restrictions with regard to the amount in which component (B) can be used, it is recommended to use this component in the amount from 1 to 50 wt. %, preferably from 5 to 30 wt. %. If component (B) is used in an amount below the lower limit of the recommended range, the obtained composition will show a tendency to decrease in curability. If component (B) is used in the amount exceeding the upper limit of the recommended range, a cured body obtained from the composition will have low mechanical strength.

Condensation reaction catalyst (C) either accelerates a condensation reaction between hydroxy groups of aforementioned component (A) and silicon-bonded alkoxy groups of aforementioned component (B), or imparts adhesiveness to the cured body obtained from the composition. The following are examples of component (C): dibutyltin dilaurate, dibutyltin dioctoate, dioctyltin dilaurate, dibutyltin maleate ester, stannous octoate, or a similar tin compound; tetrabutyltitanate, diisopropoxy-bis(acetylacetonate) titanium, diisopropoxy-bis(ethylacetoacetate) titanium, or a similar titanium compound.

Although there are no special restrictions with regard to the amount in which component (C) should be used, it is recommended to use this component in the amount from 0.001 to 10 wt. %, preferably from 0.01 to 2 wt. %. If component (C) is used in an amount below the lower limit of the recommended range, the obtained composition will show either a tendency to decrease in curability, or a tendency to decrease in adhesiveness after curing. If component (C) is used in the amount exceeding the upper limit of the recommended range, the composition will have low storage stability.

Photoinitiator (D) is a component used for accelerating a photopolymerization reaction of the composition. This component can be represented by a radical photoinitiator, cationic photoinitiator, or mixture thereof. The radical photoinitiator is exemplified by benzophenone, acetophenone, benzyl α-hydroxyketone, α-aminoketone, bis-acylphosphine oxide, or derivatives of the above. The cationic photoinitiator is exemplified by onium salts, diaryliodonium salts of sulfonic acids, triarylsulfonium salts of sulfonic acids, diaryliodonium salts of boronic acids, and triarylsulfonium salts of boronic acids. The aforementioned photoinitiators can be used in a combination of two or more.

Although there are no special restrictions with regard to the amount in which component (D) should be used, it is recommended to use this component in the amount from 0.01 to 20 wt. %, preferably from 0.1 to 10 wt. %. If component (D) is used in an amount below the lower limit of the recommended range, the obtained composition will show a tendency to decrease in photocurability. If component (D) is used in the amount exceeding the upper limit of the recommended range, a cured body obtained from the composition will have low mechanical strength.

The composition of the invention is prepared from components comprising (A), (B), (C), and (D). If necessary, an adhesion-promoting agent can be added as optional component (E). The following are examples of components suitable for use as component (E): methyltrimethoxysilane, methyltriethoxysilane, or a similar alkoxysilane; 3-glycidoxypropyl-trimethoxysilane, 2-(3,4-epoxycyclohexyl)ethyltrimethoxysilane, or a similar epoxy-containing alkoxysilane; a carbasilatrane derivative; or a silatrane derivative. Carbasilatrane derivatives are exemplified by, but not limited to, the following formulae:

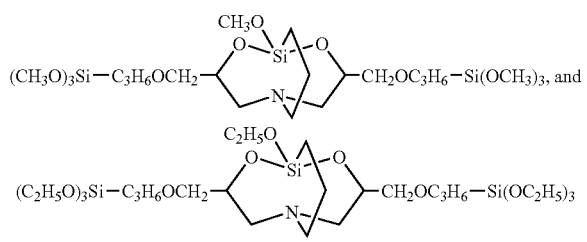

Silatrane derivatives are exemplified by, but not limited to the following formulae:

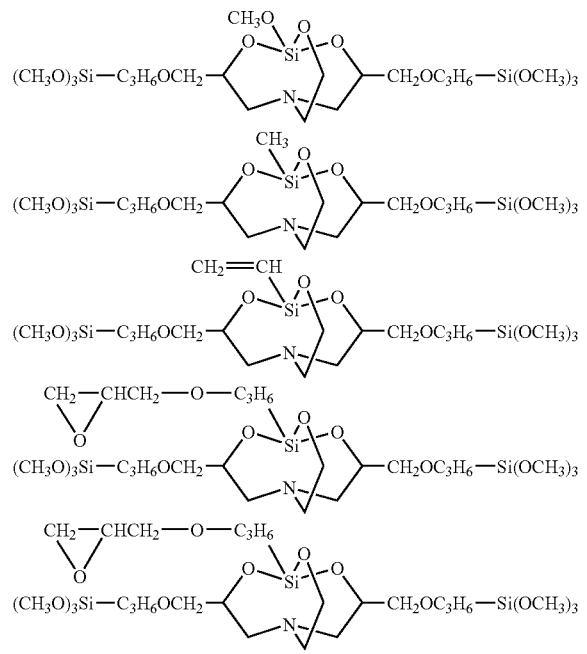

As described, e.g., in Kokai H10-195085, the aforementioned carbasilatrane derivatives can be prepared by causing a reaction between an alkoxy silane that contains an alkoxy group and an alkoxy silane that contains an epoxy group, the reaction being carried out in the present of an alcohol. Furthermore, as disclosed, e.g., in Kokai H10-182669, Kokai H11-116584 (U.S. Pat. No. 5,936,110), and Kokai H11-279182 (U.S. Pat. No. 5,945,555), the aforementioned carbasilatrane derivatives can be prepared by causing a reaction either between an epoxy-containing alkoxysilane compound and a hydroxy-amine compound or an ammonia, or between an epoxy compound, alkoxysilane and an ammonia or amine compound.

Although there are no special restrictions with regard to the amount in which component (E) should be used, it is recommended to use this component in the amount not exceeding 15 wt. %, preferably within the range from 0.5 to 10 wt. %. If component (E) is used in an amount exceeding the upper limit of the recommended range, a cured body obtained from the composition will have low mechanical strength.

To control flowability of the composition, or for improving mechanical strength and heat-resistant properties of a cured article produced from the aforementioned composition, the composition can be combined with a filler, provided that the filler is added in an amount not conflicting with the objects of the present invention. The following are examples of such fillers: dry-process silica, wet-process silica, quartz fine powder, diatomaceous earth, or a similar silica; a solid silicone resin; titanium oxide, zinc oxide, iron oxide, cerium oxide, alumina, or a similar metal oxide; rare-earth hydroxide compound, aluminum hydroxide, carbon black, graphite, silicon carbonate, mica, talc, pigment, anti-corrosion agent, and antibacterial agent.

Given below is a more detailed description of the photocurable polymer compound. A liquid organic polymer (F), in which at least one hydroxy group per molecule of the polymer is replaced by a radiation curable alkoxysiloxy group. The alkoxysiloxy group is represented by the following general formula:

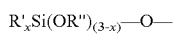

In the above formula, x is 1 or 2. Preferably x has a value of 1. R' is independently selected from the group consisting of a monovalent hydrocarbon group and radiation curable group selected from the group consisting of an acryloxy group, methacryloxy group, and epoxy group with the proviso that at least one R' is the radiation curable group. Examples of the monovalent hydrocarbon group are the same as given above. Examples of the acryloxy group are the same as given above. Examples of the methacryloxy group are the same as given above. Examples of the epoxy group are the same as given above. R'' is an alkyl group. Example of the alkyl group are the same as given above. Preferably, R'' is methyl. Because of availability, cost and reactivity, methoxy silanes and ethoxy silanes are the most preferred.

In the above formula, preferably R' is an acryloxy group or methacryloxy group. The acryloxy group- or methacryloxy group-containing alkoxysiloxy group is represented by the following general formula:

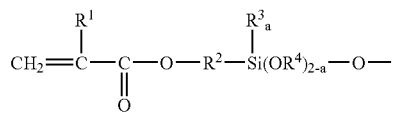

In the above formula, $R^1$ is a hydrogen atom or a methyl group, a hydrogen atom being preferable. $R^2$ is a divalent hydrocarbon group with 1 to 10 carbon atoms. Examples of this group are the same as given above. Preferably, this should be an alkylene group. $R^3$ is a monovalent hydrocarbon group of the same type as defined earlier. $R^4$ is an alkyl group of the same type as defined earlier, and a is 0 or 1. Liquid organic polymers suitable for use as raw materials for aforementioned component (F) can be represented by polybutadiene, polyisoprene, polyisobutylene, polybutylene glycol, polypropylene glycol, polyethylene glycol-polypropylene glycol copolymers, polyethylene glycol-polybutylene glycol copolymers, or products of their hydrogenates, but these examples are not limiting and other similar compounds can be used, provided that at least one hydroxy group is contained per molecule.

Although there are no special restrictions with regard to a method used for the preparation of aforementioned component (F), it is recommended to prepare this component by causing a condensation reaction between a liquid organic polymer having at least one hydroxy group per molecule of component (A) and a radiation curable alkoxysilane of component (B), the reaction being carried out in the presence of a condensation reaction catalyst of component (C).

In the aforementioned method, components (A), (B), and (C) are the same as defined above. Although there are no special restrictions with regard to reaction conditions, it is recommended that the reaction be carried out at a temperature between room temperature and 50° C. There are no special restriction with regard the amounts in which components (A), (B), and (C) should be used. Nevertheless, it is preferable that component (A) be added in an amount of 50 to 95 wt. %, preferably 70 to 90 wt. % of total weights of all components. It is recommended that the weight of component (B) constitute 1 to 50 wt. %, preferably 5 to 30 wt. % of total weights of all components. It is recommended that component (C) be added in the amount of 0.001 to 10 wt. %, preferably 0.01 to 2 wt. % of total weights of all components. If component (A) is added in an amount smaller than the lower recommended limit of the above range, a cured body obtained from the photocurable organic polymer composition that contains the obtained organic polymer will have low mechanical strength. If component (A) is used in excess of the recommended upper limit, the obtained organic polymer will have decreased photocurability. If component (B) is added in an amount smaller than the lower recommended limit of the above range, the obtained organic polymer will have decreased photocurability. If component (B) is used in excess of the recommended upper limit, a cured body obtained from the photocurable organic polymer composition that contains the obtained organic polymer will have low mechanical strength. If component (C) is added in an amount smaller than the lower recommended limit of the above range, it would be impossible to ensure sufficient acceleration of the condensation reaction. If component (C) is used in excess of the recommended upper limit, the obtained organic polymer will show a tendency to a decrease in stability. Component (F) prepared by the aforementioned method may contain non-reacted components (A), (B), and component (C).

Although there are no special limitations with regard to the amount in which component (F) should be used, it is recommended to use this component in the amount of 80 to 99.99, preferably 90 to 99.9 wt. % of the composition. If component (F) is used in an amount smaller than the lower recommended limit of the above range, a cured article formed from the composition will have a reduced mechanical strength. If this component is used in an amount exceeding the upper recommended limit of the range, the obtained composition will have reduced photocurability.

The photoinitiator, which is component (D), is used for accelerating photopolymerization of the composition. Examples of component (D) are the same as those given above for photoinitiators. These photoinitiators can be used in a combination of two or more.

Although there are no special limitations with regard to the amount in which component (D) should be used, it is recommended to use this component in the amount of 0.01 to 20 wt. %, preferably 0.1 to 10 wt. % of the composition. If component (D) is used in an amount smaller than the lower recommended limit of the above range, the obtained composition will have reduced photocurability. If this component is used in an amount exceeding the upper recommended limit of the range, a cured article formed from the composition will have a reduced mechanical strength.

The composition of the invention can be prepared from components comprising (F) and (D). If necessary, optional component (E) can be used as an adhesion-promoting agent. Examples of component (E) are the same as those given above for an adhesion-promoting agent. Although there are no special limitations with regard to the amount in which component (E) should be used, it is recommended that its content does not exceed 15 wt. % and it be used preferably in the amount of 0.5 to 10 wt. %. If this component is used in an amount exceeding the upper recommended limit of the range, a cured article formed from the composition will have a reduced mechanical strength.

To control flowability of the composition, or for improving mechanical strength and heat-resistant properties of a cured article produced from the aforementioned composition, the composition can be combined with a filler, provided that the filler is added in an amount not conflicting with the objects of the present invention. Examples of the fillers are the same as given above.

The photocurable liquid polymer composition of the present invention can be quickly cured into a moisture-resistant solid body by irradiating the composition with ultraviolet rays, electron beams, or the like. After subsequent aging, the cured body develops adhesiveness. There are no special restrictions with regard to the aging process, but in general it can be carried out by heating or retaining the body at room temperature.

EXAMPLES

The photocurable organic polymer composition of the invention will be further described in detail with reference to practical and comparative examples, where viscosities correspond to values at 25° C.

Practical Example 1

A photocurable polybutadiene composition was prepared by mixing 100 parts by weight of a 6000 mPa·s viscosity liquid polybutadiene having both molecular terminals capped with hydroxy groups (the product of Idemitsu Petrochemical Co., Ltd. trademark "Poly bd R-45HT"); 15 parts by weight of an organic silicon compound represented by the following formula:

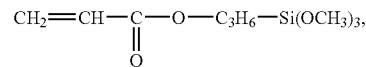

0.2 parts by weight of a diisopropoxy bis(ethylacetoacetate) titanium, 2 parts by weight of a 1-hydroxy-cyclohexyl-phenylketone, 2 parts by weight of a methyltrimethoxysilane, and 2 parts by weight of a carbasilatrane derivative of the following formula:

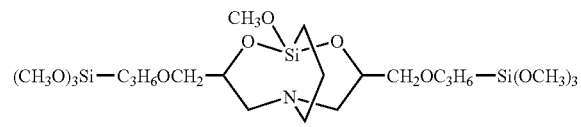

The aforementioned photocurable polybutadiene composition was applied onto the surfaces of an aluminum plate, glass plate, or a copper plate and cured by infrared irradiation at 3 Joules per square centimeter (J/cm²) from a high-pressure mercury lamp. The coated plates were then retained intact for 1 week at a temperature of 23° C. and relative humidity (RH) 55%, and adhesiveness of the cured polybutadiene body to the aforementioned adherend was observed. The results are shown in Table 1. The aforementioned photocurable polybutadiene composition was applied also onto the surface of a fluororesin plate, and the coating was cured by infrared irradiation (3 J/cm$^2$) from a high-pressure mercury lamp. The coated plate was then retained intact for 1 week at a temperature of 23° C. and RH 55%. The hardness of the obtained 1 millimeter-thick cured polybutadiene sheet was then measured in accordance with JIS 6253 in units of a E-type durometer. Moisture permeability was measured by a moisture permeation cup method in accordance with JIS Z 0208 at a temperature of 40° C. and RH 90%. The results are shown in Table 1.

Practical Example 2

A photocurable polybutadiene composition was prepared by mixing 100 parts by weight of a 6000 mPa·s viscosity liquid polybutadiene having both molecular terminals capped with hydroxy groups (the product of Idemitsu Petrochemical Co., Ltd, trademark "Poly bd R-45HT); 15 parts by weight of an organic silicon compound represented by the following formula:

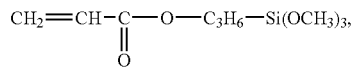

and 0.2 parts by weight of a diisopropoxy bis(ethylacetoacetate) titanium were mixed for 16 hours at room temperature. As a result, a liquid polybutadiene having a part of hydroxy groups in the molecule replaced with the group of the following formula:

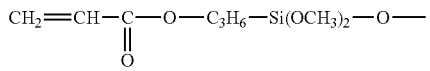

was produced.

The obtained liquid polybutadiene was then mixed with 2 parts by weight of a 1-hydroxy-cyclohexyl-phenylketone, whereby a photocurable polybutadiene composition was obtained. The obtained composition was tested with regard to adhesiveness, and a hardness of a cured polybutadiene body was measured. The results are shown in Table 1.

Practical Example 3

A photocurable polybutadiene composition was prepared by additionally mixing the composition of Practical Example 2 with 2 parts by weight of a methyltrimethoxysilane and 2 parts by weight of a carbasilatrane derivative of the following formula:

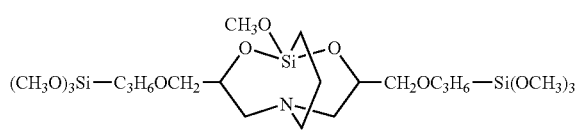

The obtained photocurable polybutadiene composition was tested with regard to adhesiveness of the composition, hardness of a polybutadiene cured body, and moisture penetration therethrough. These tests and measurements were carried out by the same methods as in Practical Example 1. The results are shown in Table 1.

Practical Example 4

A photocurable polyisoprene composition was prepared by the same method as in Practical Example 3, with the exception that a 8000 mPa·s viscosity liquid polyisoprene (the product of Idemitsu Petrochemical Co., Ltd.; Poly ip) was used instead of the polybutadiene of Practical Example 3. The obtained photocurable polyisoprene composition was tested with regard to adhesiveness of the composition, hardness of a polyisoprene cured body, and moisture penetration therethrough. These tests and measurements were carried out by the same methods as in Practical Example 1. The results are shown in Table 1.

Comparative Example 1

A photocurable polydimethylsiloxane composition was prepared by mixing 100 parts by weight of a 2000 mPa·s viscosity polydimethylsiloxane; 2 parts by weight of an organic silicon compound represented by the following formula:

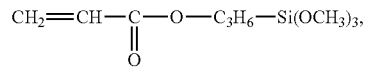

0.2 parts by weight of a diisopropoxy bis(ethylacetoacetate) titanium, and 2 parts by weight of a 1-hydroxy-cyclohexylphenylketone. The obtained polydimethylsiloxane composition was tested with regard to adhesiveness of the composition, hardness of a polydimethylsiloxane cured body, and moisture penetration therethrough. These tests and measurements were carried out by the same methods as in Practical Example 1. The results are shown in Table 1.

Comparative Example 2

A photocurable polybutadiene composition was prepared by mixing 100 parts by weight of a 4000 mPa·s viscosity liquid polybutadiene having both molecular terminals capped with hydroxy groups and esterified with an acrylic acid (the product of Osaka Yuki Kagaku Co., Ltd, trademark BAC-45); 0.2 parts by weight of a diisopropoxy bis(ethylacetoacetate) titanium, 2 parts by weight of 1-hydroxycyclohexyl-phenylketone, 2 parts by weight of a methyltrimethoxysilane, and 2 parts by weight of a carbasilatrane derivative represented by the following formula:

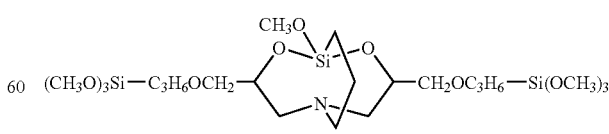

The obtained photocurable polybutadiene composition was tested with regard to adhesiveness a hardness of a cured polybutadiene body, and moisture penetration. The results are shown in Table 1.

TABLE 1

| Characteristics | | Present Invention | | | | Prior Art | |
|---|---|---|---|---|---|---|---|
| | | Pr. Ex. 1 | Pr. Ex. 2 | Pr. Ex. 3 | Pr. Ex. 4 | Comp. Ex. 1 | Comp. Ex. 2 |
| Hardness | | 30 | 40 | 40 | 40 | 20 | 60 |
| Moisture Permeability (g/m² · 24 h) | | 30 | 30 | 30 | 30 | 150 | 30 |
| Adhesiveness | Aluminum plate | | Destruction of cohesion | | | | Separation |
| | Glass plate | | Destruction of cohesion | | | | Separation |
| | Copper plate | Destruction of cohesion | Separation | Destruction of cohesion | | | Separation |

INDUSTRIAL APPLICABILITY

The photocurable polymer of the present invention is efficient in that it can be quickly cured into a moisture-penetration-resistant solid body by irradiation with ultraviolet rays, electron beams, and the like, and in that after aging the cured body acquires adhesiveness. Due to the aforementioned properties, the composition of the invention can be used for manufacturing various parts or coating agents for various parts, potting agents, etc. In particular, the composition is suitable for use as potting agents or coating agents for protecting electric circuits. Since the composition is rapidly cured by irradiation with ultraviolet rays and electron beams, they are also suitable for use as adhesives and coating agents for electrical parts with low thermal resistance, such as liquid-crystal panels, or the like.

What is claimed is:

1. A photocurable organic polymer composition comprising:
   (A) a liquid organic polymer having at least one hydroxy group per molecule said liquid organic polymer selected from the group consisting essentially of
      (i) polybutadiene,
      (ii) polyisoprene,
      (iii) polyisobutylene and
      (iv) hydrolyzates of (i), (ii), and (iii);
   (B) a radiation curable alkoxysilane;
   (C) a condensation-reaction catalyst; and
   (D) a photoinitiator.

2. The photocurable organic polymer composition of claim 1, where component (B) is a radiation curable alkoxysilane represented by the formula:

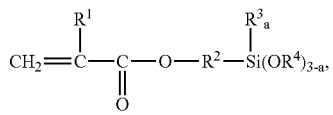

wherein R¹ is a hydrogen atom or a methyl group,
R² is a divalent hydrocarbon group with 1 to 10 carbon atoms,
each R³ is independently a monovalent hydrocarbon group,
each R⁴ is independently an alkyl group, and
a is 0 or 1.

3. A photocurable organic polymer composition comprising:
   (F) a liquid organic polymer having at least one radiation curable alkoxysiloxy group per molecule said liquid organic polymer selected from the group consisting essentially of:
      (i) polybutadiene,
      (ii) polyisoprene,
      (iii) polyisobutylene and
      (iv) hydrolyzates of (i), (ii), and (iii), and
   (D) a photoinitiator.

4. The photocurable organic polymer composition of claim 3, where component (F) is obtained by subjecting (A) a liquid organic polymer having at least one hydroxy group per molecule and (B) a radiation curable alkoxysilane, to a condensation reaction in the presence of (C), a condensation reaction catalyst.

5. The photocurable organic polymer composition of claim 4, where component (B) is a radiation curable alkoxysilane represented by the formula:

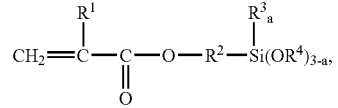

wherein R¹ is a hydrogen atom or a methyl group,
R² is a divalent hydrocarbon group with 1 to 10 carbon atoms,
each R³ is independently a monovalent hydrocarbon group,
each R⁴ is independently an alkyl group, and
a is 0 or 1.

6. The photocurable organic polymer composition of claim 3, where component (F) is a liquid organic polymer having at least one group represented by the formula:

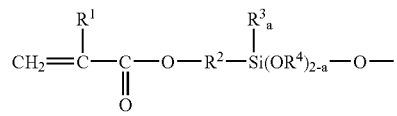

per molecule, wherein
R¹ is a hydrogen atom or a methyl group,
R2 is a divalent hydrocarbon group with 1 to 10 carbon atoms,
each B³ is independently a monovalent hydrocarbon group,
each R⁴ is independently an alkyl group, and α is 0 or 1.

7. The photocurable organic polymer composition of claim 1, where component (D) is selected from a group consisting essentially of
(i) a radical photoinitiator,
(ii) cationic photoinitiator, and
(iii) a mixture thereof.

8. The photocurable organic polymer composition of claim 1, further comprising (E) an adhesion-promoting agent.

9. The photocurable organic polymer composition of claim 1, further comprising a filler.

10. A method characterized by:
(1) providing a photocurable liquid polymer composition of claim 1;
(2) curing the photocurable liquid polymer composition by irradiating the composition with a source of energy selected from the group consisting essentially of:
(i) ultraviolet rays, and
(ii) electron beams, and
(3) aging the product of step (2).

11. The photocurable organic polymer composition of claim 3, where component (D) is a radical photoinitiator, cationic photoinitiator, or mixture thereof.

12. The photocurable organic polymer composition of claim 3, further comprising (E) an adhesion-promoting agent.

13. The photocurable organic polymer composition of claim 3, further comprising a filler.

14. A method characterized by:
(1) curing the photocurable liquid polymer composition of claim 3 by irradiating the composition with ultraviolet rays or electron beams, and
(2) aging the product of step (1).

15. A method characterized by:
(1) curing the photocurable liquid polymer composition of claim 4 by irradiating the composition with ultraviolet rays or electron beams, and
(2) aging the product of step (1).

16. A method of coating a substrate, the method comprising:
(I) providing a substrate;
(II) coating the substrate with a photocurable organic polymer composition of claim 1;
(III) curing the photocurable organic polymer composition.

17. A method of potting an article the method comprising:
(I) providing an article to be potted;
(II) potting the article with a photocurable organic polymer composition of claim 1;
(III) curing the photocurable organic polymer composition.

18. A method of adhering a material to a substrate, the method comprising:
(I) providing a substrate;
(II) coating a photocurable organic polymer composition of claim 1 on the substrate;
(III) surmounting the photocurable organic polymer composition with a material to be adhered;
(IV) curing the photocurable organic polymer.

19. A method of coating a substrate, the method comprising:
(I) providing a substrate;
(II) coating the substrate with a photocurable organic polymer composition of claim 3;
(III) curing the photocurable organic polymer composition.

20. A method of potting an article the method comprising:
(I) providing an article to be potted;
(II) potting the article with a photocurable organic polymer composition of claim 3;
(III) curing the photocurable organic polymer composition.

21. A method of adhering a material to a substrate, the method comprising:
(I) providing a substrate;
(II) coating a photocurable organic polymer composition of claim 3 on the substrate;
(III) surmounting the photocurable organic polymer composition with a material to be adhered;
(IV) curing the photocurable organic polymer.

22. A method of coating a substrate, the method comprising:
(I) providing a substrate;
(II) coating the substrate with a photocurable organic polymer composition of claim 4;
(III) curing the photocurable organic polymer composition.

23. A method of potting an article the method comprising:
(I) providing an article to be potted;
(II) potting the article with a photocurable organic polymer composition of claim 4;
(III) curing the photocurable organic polymer composition.

24. A method of adhering a material to a substrate, the method comprising:
(I) providing a substrate;
(II) coating a photocurable organic polymer composition of claim 4 on the substrate;
(III) surmounting the photocurable organic polymer composition with a material to be adhered;
(IV) curing the photocurable organic polymer.

* * * * *

UNITED STATES PATENT AND TRADEMARK OFFICE
CERTIFICATE OF CORRECTION

PATENT NO. : 7,094,306 B2
APPLICATION NO. : 10/498396
DATED : August 22, 2006
INVENTOR(S) : Osamu Mitani et al.

It is certified that error appears in the above-identified patent and that said Letters Patent is hereby corrected as shown below:

Column 12, line 65, after "each" delete "$B^3$" and insert therein -- $R^3$ --.

Column 12, line 67, after "and", delete "$\alpha$" and insert therein -- a --.

Signed and Sealed this

Twenty-eighth Day of November, 2006

JON W. DUDAS
*Director of the United States Patent and Trademark Office*